United States Patent
Zhang et al.

(10) Patent No.: US 10,474,621 B2
(45) Date of Patent: Nov. 12, 2019

(54) METHOD AND APPARATUS FOR CONTROLLING SERIAL PERIPHERAL INTERFACE OF FINGERPRINT SENSOR, AND MOBILE TERMINAL

(71) Applicant: GUANGDONG OPPO MOBILE TELECOMMUNICATIONS CORP., LTD., Dongguan, Guangdong (CN)

(72) Inventors: Qiang Zhang, Guangdong (CN); Lizhong Wang, Guangdong (CN); Haitao Zhou, Guangdong (CN); Kui Jiang, Guangdong (CN); Wei He, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/757,290

(22) PCT Filed: Aug. 5, 2016

(86) PCT No.: PCT/CN2016/093742
§ 371 (c)(1),
(2) Date: Mar. 2, 2018

(87) PCT Pub. No.: WO2017/067283
PCT Pub. Date: Apr. 27, 2017

(65) Prior Publication Data
US 2018/0357198 A1 Dec. 13, 2018

(30) Foreign Application Priority Data
Oct. 19, 2015 (CN) .......................... 2015 1 0681151

(51) Int. Cl.
*G06F 13/42* (2006.01)
*G06K 9/00* (2006.01)

(52) U.S. Cl.
CPC ....... *G06F 13/4282* (2013.01); *G06K 9/0002* (2013.01); *G06K 9/00046* (2013.01)

(58) Field of Classification Search
CPC .............. G06F 13/4282; G06K 9/0002; G06K 9/00046
See application file for complete search history.

(56) References Cited

U.S. PATENT DOCUMENTS

| 7,643,950 B1 | 1/2010 | Getzin et al. |
| 2002/0097142 A1 | 7/2002 | Janiak et al. |

(Continued)

FOREIGN PATENT DOCUMENTS

| CN | 101510946 A | 8/2009 |
| CN | 101650693 A | 2/2010 |

(Continued)

OTHER PUBLICATIONS

PCT/CN2016/093742 English translation of the International Search Report and Written Opinion dated Nov. 8, 2016, 9 pages.

(Continued)

*Primary Examiner* — Nimesh G Patel
(74) *Attorney, Agent, or Firm* — Lathrop Gage LLP

(57) ABSTRACT

The present disclosure provides a method and an apparatus for controlling a serial peripheral interface of a fingerprint sensor, and a mobile terminal. The method includes: detecting a fingerprint signal via a fingerprint sensor; and when the fingerprint signal is detected, opening the serial peripheral interface of the fingerprint sensor.

12 Claims, 3 Drawing Sheets

--- a fingerprint signal is detected via the fingerprint sensor — 101 the serial peripheral interface of the fingerprint sensor is opened when a fingerprint signal is detected — 102

(56) References Cited

U.S. PATENT DOCUMENTS

| | | |
|---|---|---|
| 2003/0025606 A1 | 2/2003 | Sabatini |
| 2005/0169503 A1 | 8/2005 | Howell et al. |
| 2005/0184853 A1 | 8/2005 | Payne et al. |
| 2015/0186705 A1* | 7/2015 | Magi .................... G06K 9/0002 382/125 |
| 2016/0034741 A1* | 2/2016 | Lan ......................... G06K 9/00 382/124 |
| 2016/0246396 A1* | 8/2016 | Dickinson ........... G06F 3/03545 |
| 2018/0032785 A1 | 2/2018 | Li |
| 2018/0060632 A1* | 3/2018 | Knabenshue ........ G06K 9/0002 |

FOREIGN PATENT DOCUMENTS

| | | |
|---|---|---|
| CN | 103376878 A | 10/2013 |
| CN | 104794433 A | 7/2015 |
| CN | 105302278 A | 2/2016 |
| EP | 3086260 A1 | 10/2016 |
| EP | 3190545 A1 | 7/2017 |
| WO | WO 2015090082 A1 | 6/2015 |

OTHER PUBLICATIONS

PCT/CN2016/093742 International Search Report and Written Opinion dated Nov. 8, 2016, 14 pages.

Chinese Patent Application No. 201510681151.2, English translation of First Office Action dated Aug. 30, 2017, 6 pages.

Chinese Patent Application No. 201510681151.2, First Office Action dated Aug. 30, 2017, 5 pages.

European Patent Application No. 16856718.8, Extended Search and Opinion dated Jun. 20, 2018, 16 pages.

U.S. Appl. No. 16/194,075, Office Action dated Feb. 8, 2019, 7 pages.

\* cited by examiner

METHOD AND APPARATUS FOR CONTROLLING SERIAL PERIPHERAL INTERFACE OF FINGERPRINT SENSOR, AND MOBILE TERMINAL

CROSS-REFERENCE TO RELATED APPLICATIONS

This application is a U.S. national phase application of International Application No. PCT/CN2016/093742, filed with the State Intellectual Property Office of P. R. China on Aug. 5, 2016, which is based upon and claims priority to Chinese Patent Application Serial No. 201510681151.2, filed on Oct. 19, 2015, the entire contents of which are incorporated herein by reference.

FIELD

The present disclosure relates to a fingerprint detection technology field, and more particularly to a method and an apparatus for controlling a serial peripheral interface of a fingerprint sensor and a mobile terminal.

BACKGROUND

With continuous development of technology, fingerprint recognition technology has been widely used in smart terminals for users' identity verification. At present, the fingerprint recognition technology of smart terminals mostly uses a serial peripheral interface (SPI) of a fingerprint sensor to send a capacitance or inductance signal formed between a finger surface and a fingerprint detection panel to a processor. The processor generates a fingerprint image according to the capacitance or inductance signal, and the fingerprint recognition is realized according to the fingerprint image.

For example, when the smart terminal enters the standby and fingerprint unlocking interface, the SPI is in an opening state, waiting to transmit the signal.

DISCLOSURE

The present disclosure aims to provide a method and an apparatus for controlling a serial peripheral interface of a fingerprint sensor and a mobile terminal.

In a first aspect, the present disclosure provides a method for controlling a serial peripheral interface of a fingerprint sensor. The method includes: detecting a fingerprint signal via the fingerprint sensor; and opening the serial peripheral interface of the fingerprint sensor when a fingerprint signal is detected.

In a second aspect, the present disclosure provides an apparatus for controlling a serial peripheral interface of a fingerprint sensor. The apparatus includes a non-transitory computer-readable medium including computer-executable instructions stored thereon and an instruction execution system which is configured by the instructions to implement at least one of: a fingerprint signal detecting module, configured to detect a fingerprint signal via the fingerprint sensor; and an interface opening module, configured to open the serial peripheral interface of the fingerprint sensor when a fingerprint signal is detected.

In a third aspect, the present disclosure provides a mobile terminal. The mobile terminal includes a memory, a processor, a fingerprint sensor and one or more programs. The one or more programs are stored in the memory and are configured to be performed by the processor. The one or more programs include instructions configured to perform the following operations: detecting a fingerprint signal via the fingerprint sensor; and opening the serial peripheral interface of the fingerprint sensor when a fingerprint signal is detected.

BRIEF DESCRIPTION OF THE DRAWINGS

Other features, objects, and advantages of embodiments of the present disclosure will become more apparent upon reading the detailed description of the non-limiting embodiments, made with reference to the following drawings.

EMBODIMENTS OF THE PRESENT DISCLOSURE

Figure 1:
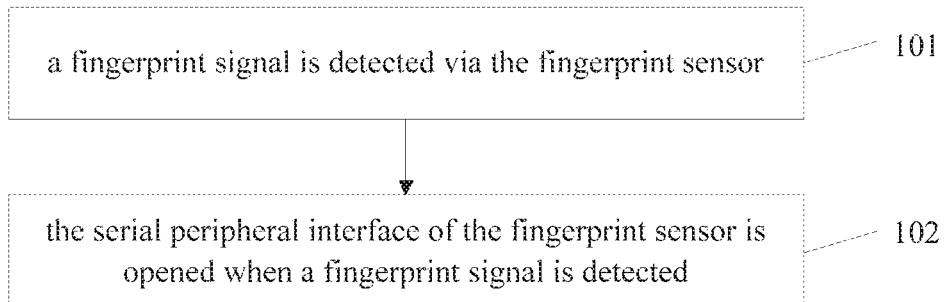
FIG. 1 is a flow chart of a method for controlling a serial peripheral interface of a fingerprint sensor according to a first embodiment of the present disclosure.

The present disclosure will be further described in detail below with reference to the accompanying drawings and embodiments. It should be understood that the specific embodiments described herein are only used to explain the present disclosure, and should not be understood as limitation to the present disclosure. In addition, it should also be noted that, for the convenience of description, only some, but not all, related to the present disclosure are shown in the accompanying drawings.

Embodiments of the present disclosure provide a method for controlling a serial peripheral interface of a fingerprint sensor. The method includes:

detecting a fingerprint signal via the fingerprint sensor; and opening the serial peripheral interface of the fingerprint sensor when a fingerprint signal is detected.

In a possible implementation, after the serial peripheral interface of the fingerprint sensor is opened, the method may further include:

closing the serial peripheral interface of the fingerprint sensor when no fingerprint signal is detected in a preset time period.

In a possible implementation, the fingerprint signal may be an interrupt signal. Based on this, opening the serial peripheral interface of the fingerprint sensor when a fingerprint signal is detected may include:

opening the serial peripheral interface of the fingerprint sensor when the interrupt signal is received by a processor.

In a possible implementation, detecting a fingerprint signal via the fingerprint sensor may include:

detecting change of an induced capacitance value via the fingerprint sensor, and determining a change event of the induced capacitance value as the fingerprint signal.

In a possible implementation, detecting change of an induced capacitance value via the fingerprint sensor and determining a change event of the induced capacitance value as the fingerprint signal may include:

detecting via the fingerprint sensor whether a change value of the induced capacitance value is greater than a preset threshold, and determining an event in which the change value is greater than the preset threshold as the fingerprint signal.

In a possible implementation, the preset threshold is less than a capacitance change value when a user's finger normally presses the fingerprint sensor.

In a possible implementation, detecting a fingerprint signal via the fingerprint sensor may include:

detecting brightness change of reflected light via the fingerprint sensor, and determining a brightness change event of the reflected light as the fingerprint signal.

In a possible implementation, opening the serial peripheral interface of the fingerprint sensor when the interrupt signal is received by a processor may include:

when the processor receives an interrupt request generated by the fingerprint sensor according to detected brightness change of the reflected light, determining that the interrupt signal is received and opening the serial peripheral interface of the fingerprint sensor.

In a possible implementation, opening the serial peripheral interface of the fingerprint sensor when the interrupt signal is received by a processor may include:

when the processor receives an interrupt request generated by the fingerprint sensor according to detected change of induced capacitance value, determining that the interrupt signal is received and opening the serial peripheral interface of the fingerprint sensor.

Embodiments of the present disclosure further provide an apparatus for controlling a serial peripheral interface of a fingerprint sensor. The apparatus includes a fingerprint signal detecting module and an interface opening module.

The fingerprint signal detecting module is configured to detect a fingerprint signal via the fingerprint sensor.

The interface opening module is configured to open the serial peripheral interface of the fingerprint sensor when a fingerprint signal is detected.

In a possible implementation, the apparatus for controlling a serial peripheral interface of a fingerprint sensor may further include an interface closing module configured to close the serial peripheral interface of the fingerprint sensor when no fingerprint signal is detected in a preset time period.

In a possible implementation, the fingerprint signal may be an interrupt signal. Based on this, the interface opening module is configured to open the serial peripheral interface of the fingerprint sensor when the interrupt signal is received by a processor.

In a possible implementation, the fingerprint signal detecting module includes a capacitance value change detecting unit configured to detect change of an induced capacitance value via the fingerprint sensor, and to determine a change event of the induced capacitance value as the fingerprint signal.

In a possible implementation, the capacitance value change detecting unit is configured to detect via the fingerprint sensor whether a change value of the induced capacitance value is greater than a preset threshold, and to determine an event in which the change value is greater than the preset threshold as the fingerprint signal.

In a possible implementation, the preset threshold is less than a capacitance change value when a user's finger normally presses the fingerprint sensor.

In a possible implementation, the fingerprint signal detecting module is configured to detect brightness change of reflected light via the fingerprint sensor, and to determine a brightness change event of the reflected light as the fingerprint signal.

In a possible implementation, the interface opening module is configured to determine that the interrupt signal is received and open the serial peripheral interface of the fingerprint sensor when the processor receives an interrupt request generated by the fingerprint sensor according to detected brightness change of the reflected light.

In a possible implementation, the interface opening module is configured to determine that the interrupt signal is received and open the serial peripheral interface of the fingerprint sensor when the processor receives an interrupt request generated by the fingerprint sensor according to detected change of induced capacitance value.

Embodiments of the present disclosure further provide a mobile terminal. The mobile terminal includes a memory, a processor, a fingerprint sensor and one or more programs. The one or more programs are stored in the memory and are configured to be performed by the processor. The one or more programs include instructions configured to perform the following operations:

detecting a fingerprint signal via the fingerprint sensor; and opening the serial peripheral interface of the fingerprint sensor when a fingerprint signal is detected.

In a possible implementation, the one or more programs may further include instructions configured to perform the following operations:

closing the serial peripheral interface of the fingerprint sensor when no fingerprint signal is detected in a preset time period.

FIG. 1 illustrates a first embodiment of the present disclosure.

FIG. 1 is a flow chart of a method for controlling a serial peripheral interface (SPI) of a fingerprint sensor according to a first embodiment of the present disclosure. The method according to this embodiment may be performed by an apparatus for controlling a serial peripheral interface of a fingerprint sensor. The apparatus may be realized by hardware and/or software, and may generally be integrated into a mobile terminal configured with a fingerprint sensor.

Referring to FIG. 1, the method for controlling a SPI of a fingerprint sensor includes the following.

At block 101, a fingerprint signal is detected via the fingerprint sensor.

In the related art, when a smart terminal enters a standby fingerprint unlocking interface, the SPI is in an opening state, waiting to transmit a signal. However, during a period of standby and waiting for a user to unlock, the user may not touch the fingerprint sensor in a short time, resulting in long-term idle state of the SPI, increasing system power consumption.

To overcome this problem, at block 101 in embodiments of the present disclosure, the fingerprint signal is firstly detected via the fingerprint sensor.

Fingerprint sensors currently used are mainly divided into optical fingerprint sensors and capacitive fingerprint sensors. The optical fingerprint sensor uses the principle of light refraction and reflection. Light is emitted toward a prism from the bottom, and emitted out through the prism. Refraction angles of the light incident on uneven fingerprint lines on the finger surface may be different, and brightness of light reflected by the uneven fingerprint lines on the finger surface may be different. The fingerprint signal may be detected using the brightness change of the reflected light. In detail, when the finger is placed on the fingerprint collection device, the brightness of the reflected light obtained by the optical fingerprint sensor may change. The optical fingerprint sensor detects whether there is a fingerprint signal according to the brightness change of the reflected light.

Therefore, in a possible implementation, detecting the fingerprint signal via the fingerprint sensor at block 101 may include:

detecting brightness change of the reflected light via the fingerprint sensor, and determining a brightness change event of the reflected light as the fingerprint signal.

Since a distance between a ridge line of the fingerprint and a metal electrode of a capacitive fingerprint sensor array is different from a distance between a valley line of the fingerprint and the metal electrode of the capacitive fingerprint sensor array (due to different depths of the lines), capacitance values induced by respective metal electrodes of the capacitive fingerprint sensor array are different. The capacitive fingerprint sensor may detect the fingerprint signal according to the change of the induced capacitance value. In detail, when a finger is put on the fingerprint collection device, the capacitance value induced by the metal electrodes of the capacitive fingerprint sensor array may change, the capacitive fingerprint sensor detects whether there is the fingerprint signal according to the change of the induced capacitance value.

At block 102, the serial peripheral interface of the fingerprint sensor is opened when a fingerprint signal is detected.

According to a result detected at block 101, when the optical fingerprint sensor detects the brightness change of the reflected light or when the capacitive fingerprint sensor detects the change of the capacitance value induced by the metal electrodes of the capacitive fingerprint sensor array, the fingerprint sensor may send a signal to the processor at a master end of the serial peripheral interface of the fingerprint sensor. The processor opens the serial peripheral interface of the fingerprint sensor via a corresponding instruction.

With this embodiment, by detecting the fingerprint signal via the fingerprint sensor, and opening the serial peripheral interface of the fingerprint sensor when the fingerprint signal is detected, it can be determined whether to open the serial peripheral interface of the fingerprint sensor according to whether the fingerprint signal is detected. Only when the fingerprint signal is detected, the serial peripheral interface of the fingerprint sensor is opened, avoiding long-term opening of the serial peripheral interface of the fingerprint sensor, and avoiding increasing system power consumption.

In a preferable implementation of this embodiment, after the serial peripheral interface of the fingerprint sensor is opened, a following action may be included. The serial peripheral interface of the fingerprint sensor is closed when no fingerprint signal is detected in a preset time period. The change of the capacitance value sensed by the metal electrodes of the capacitive fingerprint sensor array or the brightness change of the reflected light obtained by the optical fingerprint sensor may be generated by a finger sliding rather than by a finger putting on the fingerprint collection device. In this case, if the serial peripheral interface of the fingerprint sensor is opened continuously, the system power consumption may be increased. Therefore, after the serial peripheral interface of the fingerprint sensor is opened, if no fingerprint signal is detected in a preset time period, the detected fingerprint signal may not be generated by an operation of putting a finger on the fingerprint collection device for fingerprint collection, and the serial peripheral interface of the fingerprint sensor may be closed. The preset time period may be determined according to empirical values. By closing the serial peripheral interface of the fingerprint sensor when no fingerprint signal is detected in the preset time period, the opening and closing of the serial peripheral interface of the fingerprint sensor may be controlled flexibly, further reducing the system power consumption.

Figure 2:
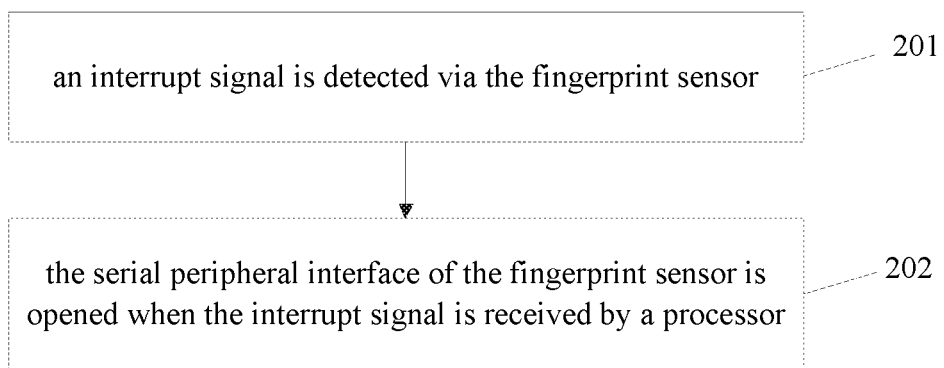
FIG. 2 is a flow chart of a method for controlling a serial peripheral interface of a fingerprint sensor according to a second embodiment of the present disclosure.

FIG. 2 illustrates a second embodiment of the present disclosure.

This embodiment is based on the method for controlling a serial peripheral interface of a fingerprint sensor provided in the first embodiment. Further, the fingerprint signal is an interrupt signal. The action of opening the serial peripheral interface of the fingerprint sensor when a fingerprint signal is detected is specifically implemented as opening the serial peripheral interface of the fingerprint sensor when the interrupt signal is received by a processor.

Referring to FIG. 2, the method for controlling a serial peripheral interface of a fingerprint sensor includes the following.

At block 201, an interrupt signal is detected by the fingerprint sensor.

When the optical fingerprint sensor detects brightness change of the reflected light or when the capacitive fingerprint sensor detects change of capacitance value induced by the metal electrodes of the capacitive fingerprint sensor array, an interrupt request may be sent to the processor via an interrupt request line. The processor determines whether there is an interrupt signal according to whether the fingerprint sensor sends the interrupt request.

At block 202, the serial peripheral interface of the fingerprint sensor is opened when the interrupt signal is received by a processor.

For example, the interrupt signal received by the processor may be an interrupt signal corresponding to the interrupt request sent to the processor by the optical fingerprint sensor via the interrupt request line when the optical fingerprint sensor detects the brightness change of the reflected light, or may be an interrupt signal corresponding to the interrupt request sent to the processor by the capacitive fingerprint sensor via the interrupt request line when the capacitive fingerprint sensor detects the change of capacitance value induced by the metal electrodes of the capacitive fingerprint sensor array.

Therefore, in a possible implementation, opening the serial peripheral interface of the fingerprint sensor when the interrupt signal is received by the processor may include the following.

When the processor receives an interrupt request generated by the fingerprint sensor according to detected brightness change of the reflected light, it is determined that the interrupt signal is received and the serial peripheral interface of the fingerprint sensor is opened.

In another possible implementation, opening the serial peripheral interface of the fingerprint sensor when the interrupt signal is received by the processor may include the following.

When the processor receives the interrupt request generated by the fingerprint sensor according to detected change of induced capacitance value, it is determined that the interrupt signal is received and the serial peripheral interface of the fingerprint sensor is opened.

After the processor receives the interrupt request sent by the fingerprint sensor via the interrupt request line, the processor responds to the interrupt request, suspends the execution of currently running program and turns to process the interrupt request of the fingerprint sensor. The interrupt request is a request for opening the serial peripheral interface of the fingerprint sensor. Since a master-slave port of the serial peripheral interface of the fingerprint sensor is connected to the processor, and an assistant-slave port of the serial peripheral interface of the fingerprint sensor is connected to the fingerprint sensor, only the processor can open the serial peripheral interface of the fingerprint sensor. The processor opens the serial peripheral interface of the fingerprint sensor through a corresponding instruction. The processor continues to execute the suspended program after the serial peripheral interface of the fingerprint sensor is opened.

With this embodiment, by specifying the fingerprint signal as the interrupt signal, and by implementing opening the serial peripheral interface of the fingerprint sensor when the fingerprint signal is detected as opening the serial peripheral interface of the fingerprint sensor when the interrupt signal is received by the processor, the serial peripheral interface of the fingerprint sensor may be opened quickly in response to the interrupt signal, avoiding that the fingerprint information collected by the fingerprint collection device cannot be received entirely due to too late opening of the serial peripheral interface of the fingerprint sensor.

Figure 3:
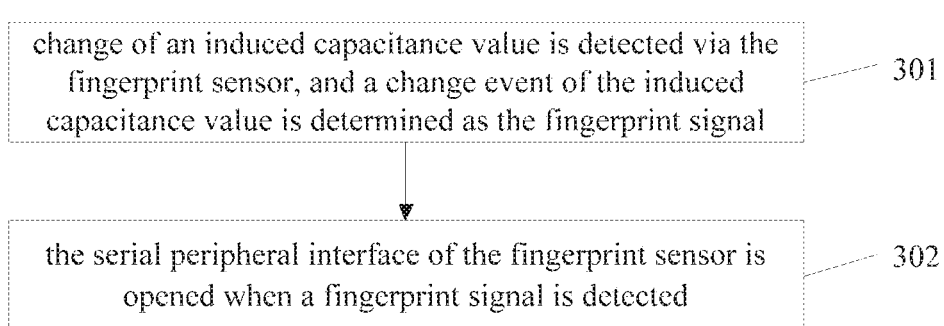
FIG. 3 is a flow chart of a method for controlling a serial peripheral interface of a fingerprint sensor according to a third embodiment of the present disclosure.

FIG. 3 illustrates a third embodiment of the present disclosure.

This embodiment is based on the method for controlling a serial peripheral interface of a fingerprint sensor provided in the first embodiment. Further, detecting a fingerprint signal by the fingerprint sensor is specifically implemented as detecting change of an induced capacitance value via the fingerprint sensor, and determining a change event of the induced capacitance value as the fingerprint signal.

Referring to FIG. 3, the method for controlling a serial peripheral interface of a fingerprint sensor includes the following.

At block 301, change of an induced capacitance value is detected via the fingerprint sensor, and a change event of the induced capacitance value is determined as the fingerprint signal.

Each point of a sensor array in a capacitive fingerprint sensor is a metal electrode, which acts as a first pole of a capacitor, and a point corresponding to a finger pressed on a sensing surface acts as a second pole of the capacitor. The sensing surface forms a dielectric layer between the two poles. A distance between a ridge of the fingerprint and the second pole of the capacitor is different from a distance between a valley of the fingerprint and the second pole of the capacitor, and thus the capacitance values induced by the metal electrodes of the capacitive fingerprint sensor array are different. The capacitance values induced by the metal electrodes of the capacitive fingerprint sensor array are measured and recorded, and thus a fingerprint image with gray scale may be obtained. The change of the capacitance values induced by the metal electrodes of the capacitive fingerprint sensor array is detected by the fingerprint sensor. When a change event of the induced capacitance value occurs, the change event of the induced capacitance value is determined as the fingerprint signal.

At block 302, the serial peripheral interface of the fingerprint sensor is opened when a fingerprint signal is detected.

With this embodiment, detecting a fingerprint signal via the fingerprint sensor is implemented as detecting the change of the induced capacitance value via the fingerprint sensor, and determining the change event of the induced capacitance value as the fingerprint signal. The operation of putting the finger on the fingerprint sensor may be keenly sensed by using the change of the induced capacitance value, the serial peripheral interface of the fingerprint sensor may be opened more quickly, avoiding that the fingerprint information collected by the fingerprint collection device cannot be received entirely due to too late opening of the serial peripheral interface of the fingerprint sensor.

Figure 4:
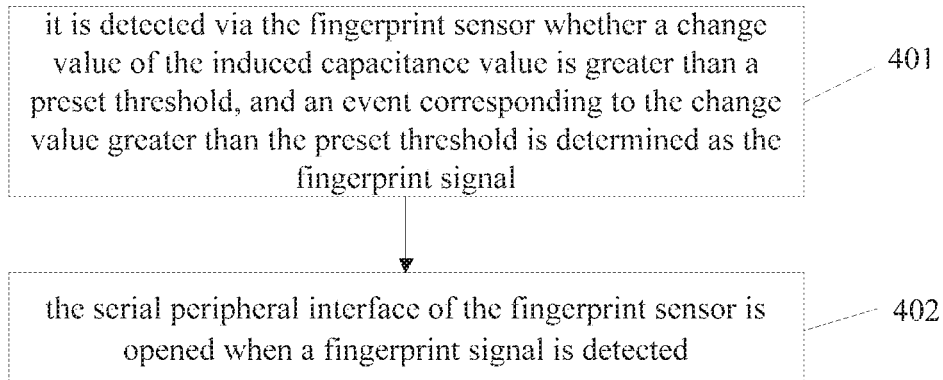
FIG. 4 is a flow chart of a method for controlling a serial peripheral interface of a fingerprint sensor according to a fourth embodiment of the present disclosure.

FIG. 4 illustrates a fourth embodiment of the present disclosure.

This embodiment is based on the method for controlling a serial peripheral interface of a fingerprint sensor provided in the third embodiment. Further, detecting change of the induced capacitance value via the fingerprint sensor and determining a change event of the induced capacitance value as the fingerprint signal is implemented as detecting via the fingerprint sensor whether a change value of the induced capacitance value is greater than a preset threshold, and determining an event corresponding to the change value of the induced capacitance value greater than the preset threshold as the fingerprint signal.

Referring to FIG. 4, the method for controlling a serial peripheral interface of a fingerprint sensor includes the following.

At block 401, it is detected via the fingerprint sensor whether a change value of the induced capacitance value is greater than a preset threshold, and an event corresponding to the change value greater than the preset threshold is determined as the fingerprint signal.

Since a capacitor is formed between the metal electrode of the sensor array in the capacitive fingerprint sensor and a finger when the finger is close to the fingerprint sensor, the induced capacitance value may change slightly. However, at this time, the user's finger may merely slide across the surface of the fingerprint sensor, and the finger is not placed on the fingerprint sensor. If the serial peripheral interface of the fingerprint sensor is opened at this time for waiting to transmit signals, the system power consumption may be increased. In order to avoid above situation, in this embodiment, a threshold of the capacitance change value is preset. The threshold of the capacitance change value may be determined according to experience, generally slightly less than a change value of the induced capacitance value when the fingerprint sensor is normally pressed. Only when the fingerprint sensor detects that the change value of the induced capacitance value is greater than the preset threshold, it determines that the fingerprint signal is detected. That is, when an event in which the change value of the induced capacitance value is greater than the preset threshold, the event corresponding to the change value greater than the preset threshold is determined as the fingerprint signal.

Based on this, in a possible implementation, the preset threshold at block 5401 is less than the capacitance change value when the user's finger normally presses the fingerprint sensor.

At block 402, the serial peripheral interface of the fingerprint sensor is opened when the fingerprint signal is detected.

With this embodiment, detecting change of induced capacitance value via the fingerprint sensor and determining the change event of the induced capacitance value as the fingerprint signal is implemented as detecting via the fingerprint sensor whether the change value of the induced capacitance value is greater than the preset threshold and determining the event corresponding to the change value greater than the preset threshold as the fingerprint signal. It can be determined whether there is an operation that the user inputs fingerprint information using the fingerprint sensor according to the detected change value of the induced capacitance value, avoiding that the serial peripheral interface of the fingerprint sensor is opened due to other operations, and further reducing the system power consumption.

Figure 5:
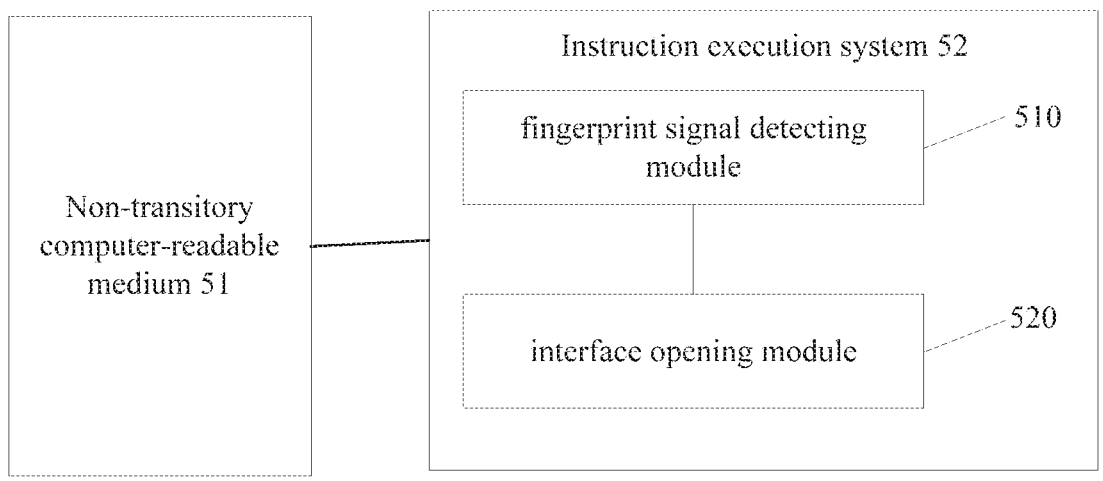
FIG. 5 is a block diagram illustrating an apparatus for controlling a serial peripheral interface of a fingerprint sensor according to a fifth embodiment of the present disclosure.

FIG. 5 is a block diagram illustrating an apparatus for controlling a serial peripheral interface of a fingerprint sensor according to a fifth embodiment of the present disclosure.

Referring to FIG. 5, the apparatus for controlling a serial peripheral interface of a fingerprint sensor includes a non-transitory computer-readable medium 51 including computer-executable instructions stored thereon and an instruction execution system 52 which is configured by the instructions to implement at least one of a fingerprint signal detecting module 510 and an interface opening module 520.

The fingerprint signal detecting module 510 is configured to detect a fingerprint signal via the fingerprint sensor.

The interface opening module 520 is configured to open the serial peripheral interface of the fingerprint sensor when a fingerprint signal is detected.

With this embodiment, it can be determined whether to open the serial peripheral interface of the fingerprint sensor according to whether the fingerprint signal is detected. Only when the fingerprint signal is detected, the serial peripheral interface of the fingerprint sensor is opened, avoiding long-term opening of the serial peripheral interface of the fingerprint sensor, and avoiding increasing system power consumption.

Figure 6:
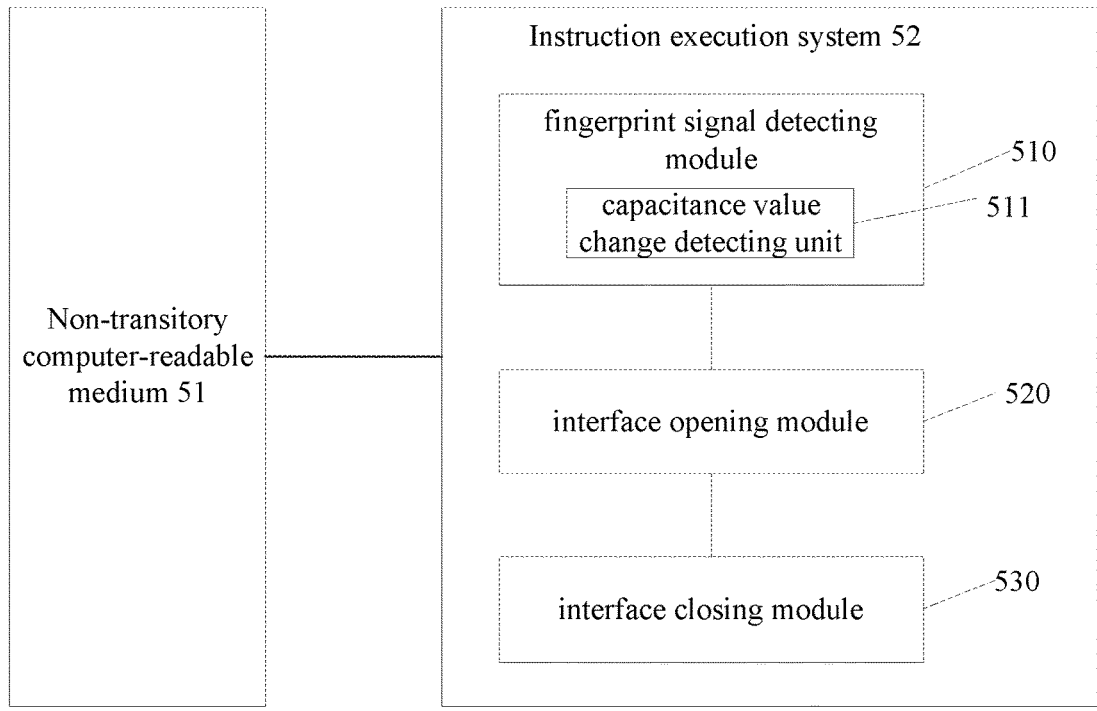
FIG. 6 is a block diagram illustrating an apparatus for controlling a serial peripheral interface of a fingerprint sensor according to a sixth embodiment of the present disclosure.

FIG. 6 is a block diagram illustrating an apparatus for controlling a serial peripheral interface of a fingerprint sensor according to a sixth embodiment of the present disclosure.

As illustrated in FIG. 6, the instruction execution system 52 is further configured by the instructions to implement an interface closing module 530.

The interface closing module 530 is configured to close the serial peripheral interface of the fingerprint sensor when no fingerprint signal is detected in a preset time period.

Further, the fingerprint signal detecting module 510 may be configured to detect brightness change of reflected light via the fingerprint sensor, and to determine a brightness change event of the reflected light as the fingerprint signal.

Further, the fingerprint signal is an interrupt signal. The interface opening module 520 is configured to open the serial peripheral interface of the fingerprint sensor when the interrupt signal is received by a processor.

In a possible implementation, the interface opening module 520 may be configured to determine that the interrupt signal is received and open the serial peripheral interface of the fingerprint sensor when the processor receives an interrupt request generated by the fingerprint sensor according to detected brightness change of reflected light.

In another possible implementation, the interface opening module 520 may be configured to determine that the interrupt signal is received and open the serial peripheral interface of the fingerprint sensor when the processor receives an interrupt request generated by the fingerprint sensor according to detected change of induced capacitance value.

Further, the fingerprint signal detecting module 510 includes a capacitance value change detecting unit 511.

The capacitance value change detecting unit 511 is configured to detect change of an induced capacitance value via the fingerprint sensor, and to determine a change event of the induced capacitance value as the fingerprint signal.

Further, the capacitance value change detecting unit 511 is configured to detect via the fingerprint sensor whether a change value of the induced capacitance value is greater than a preset threshold, and to determine an event corresponding to the change value greater than the preset threshold as the fingerprint signal.

In a possible implementation, the preset threshold is less than a capacitance change value when a user's finger normally presses the fingerprint sensor.

The above apparatus for controlling a serial peripheral interface of a fingerprint sensor may execute the method for controlling a serial peripheral interface of a fingerprint sensor provided by embodiments of the present disclosure, with corresponding functions and advantageous effects.

Figure 7:
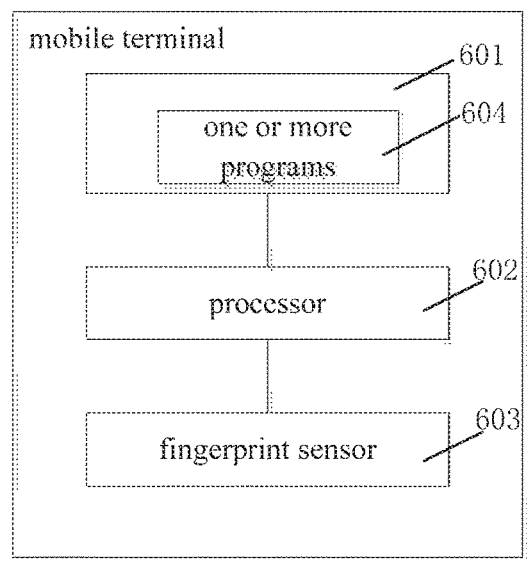
FIG. 7 is a schematic diagram illustrating a mobile terminal according to a seventh embodiment of the present disclosure.

FIG. 7 is a block diagram illustrating a mobile terminal according to a seventh embodiment of the present disclosure.

Embodiments of the present disclosure provide a mobile terminal. The mobile terminal includes a memory 601, a processor 602, a fingerprint sensor 603 and one or more programs 604. The one or more programs 604 are stored in the memory 601 and are configured to be performed by the processor 602. The one or more programs 604 include instructions configured to perform operations of:

detecting a fingerprint signal via the fingerprint sensor; and opening the serial peripheral interface of the fingerprint sensor when a fingerprint signal is detected.

Therefore, the mobile terminal may determine whether to open the serial peripheral interface of the fingerprint sensor according to whether the fingerprint signal is detected. Only when the fingerprint signal is detected, the serial peripheral interface of the fingerprint sensor is opened, avoiding long-term opening of the serial peripheral interface of the fingerprint sensor, and avoiding increasing system power consumption.

In a possible implementation, the one or more programs 604 may further include instructions configured to perform operations of closing the serial peripheral interface of the fingerprint sensor when no fingerprint signal is detected in a preset time period.

By closing the serial peripheral interface of the fingerprint sensor when no fingerprint signal is detected in the preset time period, the opening and closing of the serial peripheral interface of the fingerprint sensor may be controlled flexibly, further reducing the system power consumption.

The sequence numbers of the foregoing embodiments of the present disclosure are merely for the purpose of description and do not represent the advantages and disadvantages of the embodiments.

Those ordinary skilled in the art should understand that the above modules and steps of the present disclosure may be implemented by common computing devices. Then can be centralized on a single computing device or distributed on a network formed by multiple computing devices. Alternatively, they can be implemented with program code executable by a computer device, so that they can be stored in a storage device and executed by a computing device. Or they can be implemented by making into individual integrated circuit modules, respectively, or they can be implemented by making multiple modules or steps into a single integrated circuit module. As such, the present disclosure is not limited to any particular combination of hardware and software.

Each embodiment in this specification is described in a progressive manner. Each embodiment focuses on differences from other embodiments, and the same or similar parts among the embodiments may refer to each other.

The foregoing descriptions are merely preferred embodiments of the present disclosure, and are not intended to limit the present disclosure. For those skilled in the art, the present disclosure may have various modifications and changes. Any modification, equivalent replacement, improvement and the like made within the spirit and principle of the present disclosure should be included in the protection scope of the present disclosure.

What is claimed is:

1. A method for controlling a serial peripheral interface of a fingerprint sensor, comprising:
   detecting change of an induced capacitance value via the fingerprint sensor, and determining a change event of the induced capacitance value as a signal, or detecting brightness change of reflected light via the fingerprint sensor, and determining a brightness change event of the reflected light as the signal;
   in response to detecting the signal via the fingerprint sensor, sending an interrupt request via the fingerprint sensor to a processor over an interrupt request line, wherein the interrupt request is a request for activating the serial peripheral interface of the fingerprint sensor;
   after the processor has received the interrupt request, responding to the interrupt request, suspending an execution of a currently running program and turning to process the interrupt request, via the processor, wherein a master-slave port of the serial peripheral interface is connected to the processor, and an assistant-slave port of the serial peripheral interface is connected to the fingerprint sensor, such that only the processor can activate the serial peripheral interface of the fingerprint sensor;
   activating the serial peripheral interface of the fingerprint sensor via the processor; and
   continuing to execute the suspended program via the processor.

2. The method according to claim 1, after activating the serial peripheral interface of the fingerprint sensor, further comprising:
   deactivating the serial peripheral interface of the fingerprint sensor when no signal is detected in a preset time period.

3. The method according to claim 1, wherein detecting change of an induced capacitance value via the fingerprint sensor and determining a change event of the induced capacitance value as the signal comprises:
   detecting via the fingerprint sensor whether a change value of the induced capacitance value is greater than a preset threshold, and determining an event in which the change value is greater than the preset threshold as the signal.

4. The method according to claim 3, wherein the preset threshold is less than a capacitance change value when a user's finger normally presses the fingerprint sensor.

5. An apparatus for controlling a serial peripheral interface of a fingerprint sensor, comprising:
   a non-transitory computer-readable medium comprising computer-executable instructions stored thereon; and
   an instruction execution system configured by the instructions to implement:
   a signal detecting module, comprising: a capacitance value change detecting unit, configured to detect change of an induced capacitance value via the fingerprint sensor, and to determine a change event of the induced capacitance value as a signal, or detect brightness change of reflected light via the fingerprint sensor, and determine a brightness change event of the reflected light as the signal, wherein the signal detecting module is configured to, in response to detecting the signal via the fingerprint sensor, send an interrupt request via the fingerprint sensor to a processor over an interrupt request line, wherein the interrupt request is a request for activating the serial peripheral interface of the fingerprint sensor; and
   an interface activating module, configured to, after the processor has received the interrupt request, respond to the interrupt request, suspend an execution of a currently running program and turn to process the interrupt request, via the processor, wherein a master-slave port of the serial peripheral interface is connected to the processor, and an assistant-slave port of the serial peripheral interface is connected to the fingerprint sensor, such that only the processor can activate the serial peripheral interface of the fingerprint sensor; activate the serial peripheral interface of the fingerprint sensor when the signal is detected; and continue to execute the suspended program via the processor.

6. The apparatus according to claim 5, wherein the instruction execution system is further configured by the instructions to implement:
   an interface deactivating module, configured to deactivate the serial peripheral interface of the fingerprint sensor when no signal is detected in a preset time period.

7. The apparatus according to claim 5, wherein the capacitance value change detecting unit is configured to:
   detect via the fingerprint sensor whether a change value of the induced capacitance value is greater than a preset threshold, and determine an event corresponding to the change value greater than the preset threshold as the signal.

8. The apparatus according to claim 7, wherein the preset threshold is less than a capacitance change value when a user's finger normally presses the fingerprint sensor.

9. A mobile terminal, comprising a memory, a processor, a fingerprint sensor and one or more programs, wherein the one or more programs are stored in the memory and are configured to be performed by the processor, and the one or more programs comprise instructions configured to perform operations of:
   detecting change of an induced capacitance value via the fingerprint sensor, and determining a change event of the induced capacitance value as a signal, or detecting brightness change of reflected light via the fingerprint sensor, and determining a brightness change event of the reflected light as the signal;
   in response to detecting the signal via the fingerprint sensor, sending an interrupt request via the fingerprint sensor to a processor over an interrupt request line, wherein the interrupt request is a request for activating the serial peripheral interface of the fingerprint sensor;
   after the processor has received the interrupt request, responding to the interrupt request, suspending an execution of a currently running program and turning to process the interrupt request, via the processor, wherein a master-slave port of the serial peripheral interface is connected to the processor, and an assistant-slave port of the serial peripheral interface is connected to the fingerprint sensor, such that only the processor can activate the serial peripheral interface of the fingerprint sensor;
   activating the serial peripheral interface of the fingerprint sensor via the processor; and continuing to execute the suspended program via the processor.

10. The mobile terminal according to claim 9, wherein the one or more programs further comprise instructions configured to perform operations of:
   deactivating the serial peripheral interface of the fingerprint sensor when no signal is detected in a preset time period.

11. The mobile terminal according to claim 9, wherein detecting change of an induced capacitance value via the fingerprint sensor and determining a change event of the induced capacitance value as the signal comprises:
   detecting via the fingerprint sensor whether a change value of the induced capacitance value is greater than a preset threshold, and determining an event in which the change value is greater than the preset threshold as the signal.

12. The mobile terminal according to claim 11, wherein the preset threshold is less than a capacitance change value when a user's finger normally presses the fingerprint sensor.

* * * * *